(12) United States Patent
Campbell

(10) Patent No.: US 6,393,522 B1
(45) Date of Patent: May 21, 2002

(54) METHOD AND APPARATUS FOR CACHE MEMORY MANAGEMENT

(75) Inventor: Paul W. Campbell, Oakland, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/493,043

(22) Filed: Jan. 27, 2000

(51) Int. Cl.⁷ .............................................. G06F 12/00
(52) U.S. Cl. ..................................................... 711/120
(58) Field of Search ......................................... 711/120

(56) References Cited

U.S. PATENT DOCUMENTS

| | | | | |
|---|---|---|---|---|
| 5,535,359 A | * | 7/1996 | Hata et al. | 711/120 X |
| 5,802,561 A | * | 9/1998 | Fava et al. | 711/120 |
| 5,898,852 A | * | 4/1999 | Petolino, Jr. et al. | 712/214 |
| 6,243,791 B1 | * | 6/2001 | Vondran, Jr. | 711/120 |
| 6,275,902 B1 | * | 8/2001 | Hotta et al. | 711/120 X |

* cited by examiner

Primary Examiner—David L. Robertson
(74) Attorney, Agent, or Firm—Vedder, Price, Kaufman & Kammholz

(57) ABSTRACT

A method and apparatus for managing cache memory is described. The invention improves the efficiency of cache usage by monitoring parameters of multiple caches, for example, empty space in each cache or the number of cache misses of each cache, and selectively assigns elements of data or results to a particular cache based on the monitored parameters. Embodiments of the invention can track absolute values of the monitored parameters or can track values of the monitored parameters of one cache relative to one or more other caches. Embodiments of the invention may be scaled to accommodate larger numbers of caches at a particular cache level and may be implemented among multiple cache levels.

11 Claims, 6 Drawing Sheets

METHOD AND APPARATUS FOR CACHE MEMORY MANAGEMENT

TECHNICAL FIELD OF THE INVENTION

The invention relates generally to computer systems and, more specifically, to techniques for managing cache memory.

BACKGROUND OF THE INVENTION

In a typical computer system, a processor receives data to be processed from a main memory. After the processing is complete, the processor stores results in the main memory. However, a processor often operates at a faster rate than the rate at which the main memory can provide data and store results. Thus, the main memory imposes a limitation on the performance of the processor. To avoid this limitation, a faster type of memory, referred to as a cache, is interposed between the processor and the main memory. The cache is used to store frequently used data so that the frequently used data may be provided to the processor more quickly, thereby reducing the average time needed to provide data from the main memory to the processor.

As computer systems have increased in complexity, processors have been provided with multiple caches. However, with multiple caches, a decision must be made as to which cache will be used to process a particular element of data or a result. In the past, the assignment of data to a cache has been essentially random. While random assignment of data among multiple caches is feasible for some applications, it does not provide the most efficient use of the multiple caches. Thus, a technique is needed to improve the performance of a computer system having multiple caches.

DETAILED DESCRIPTION OF A PREFERRED EMBODIMENT

A method and apparatus for managing cache memory is described. The invention improves the efficiency of cache usage by monitoring parameters of multiple caches, for example, empty space in each cache or the number of cache misses of each cache, and selectively assigns elements of data or results to a particular cache based on the monitored parameters. Embodiments of the invention can track absolute values of the monitored parameters or can track values of the monitored parameters of one cache relative to one or more other caches. Embodiments of the invention may be scaled to accommodate larger numbers of caches at a particular cache level and may be implemented among multiple cache levels.

Figure 1:
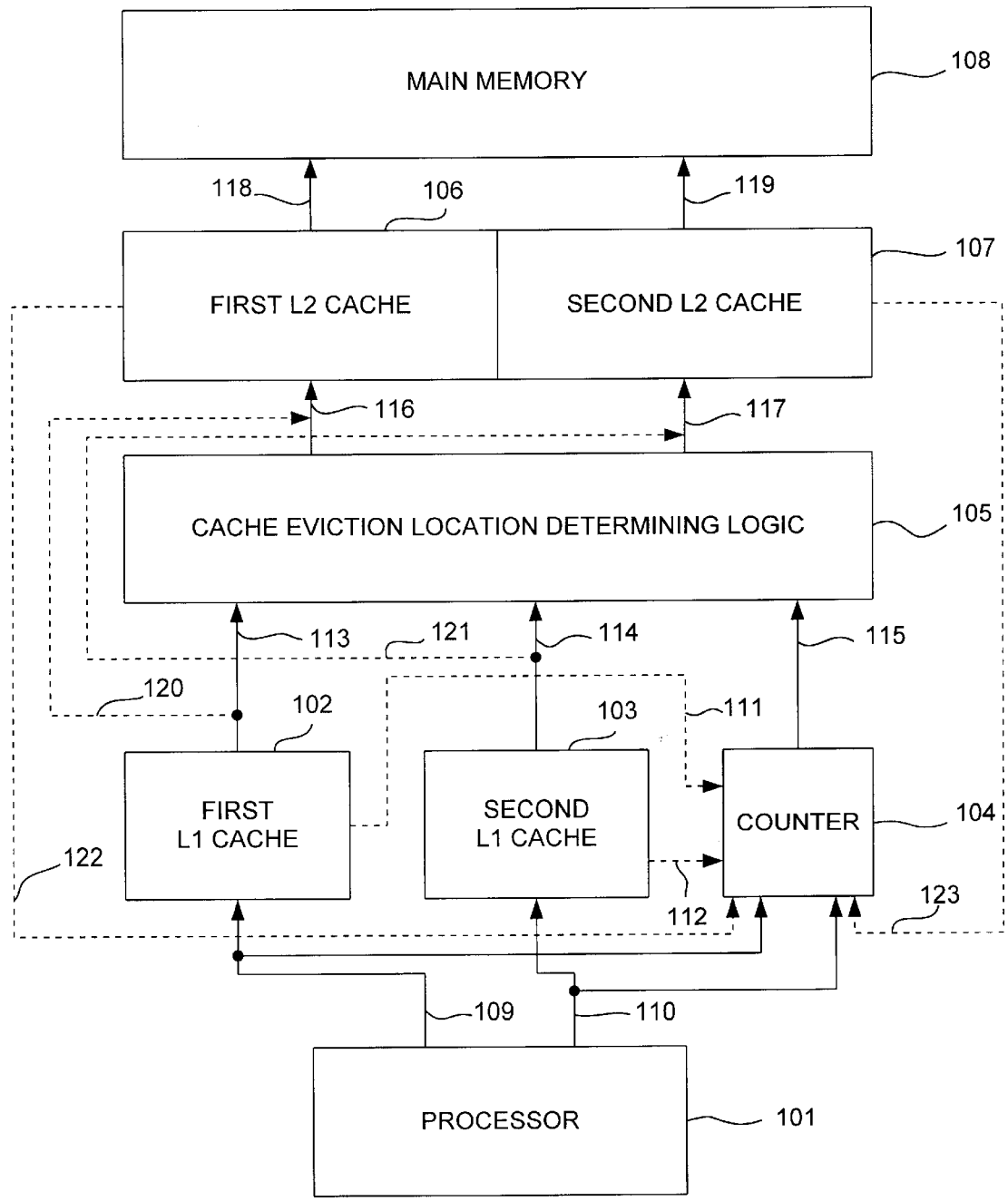
FIG. 1 is a block diagram illustrating an embodiment of the present invention.

FIG. 1 is a block diagram illustrating an embodiment of the present invention. processor 101 passes data to be stored to either a first L1 cache 102 or a second L1 cache 103. The first L1 cache 102 may be used as an instruction cache, and the second L1 cache 103 may be used as a data cache. A counter 104 is coupled to processor 101 and/or to first L1 cache 102 and second L1 cache 103. Counter 104 monitors the data being passed from processor 101 to first L1 cache 102 or second L1 cache 103 via couplings 109 or 110, respectively. Alternatively, first L1 cache 102 and second L1 cache 103 provide indications to counter 104 via couplings 111 and 112, respectively, when data is passed from processor 101. Thus, counter 104 is provided with information indicating changes to the data stored in first L1 cache 102 and second L1 cache 103.

When an attempt is made to access data in a system including a cache, an attempt is made to obtain the data from the cache since the cache is capable of providing data that it contains quickly. If the data is not available from the cache, the data is retrieved from a higher level of cache memory or from main memory. If, when an attempt is made to access data, the data is available from the cache, the situation is described as a cache hit. On the contrary, if the data is not available from the cache, the situation is described as a cache miss.

The information provided to counter 104 may be used to indicate cache misses of the first L1 cache 102 and the second L1 cache 103. Based on the cache misses between the first L1 cache 102 and the second L1 cache 103, counter 104 controls cache eviction location determining logic 105 via coupling 115. When a cache line is evicted and first L1 cache 102 or second L1 cache 103 is needed to store additional data from processor 101, the existing data in first L1 cache 102 and second L1 cache 103 are evicted from their respective caches via couplings 113 and 114 through cache eviction location determining logic 105 and via couplings 116 and 117 to either of first L2 cache 106 or second L2 cache 107.

Alternatively, data may be evicted directly from first L1 cache 102 and second L1 cache 103 directly to first L2 cache 106 and second L2 cache 107 via couplings 120 and 121 under the control of cache eviction location determining logic 105. When data is to be evicted from first L1 cache 102, cache eviction location determining logic 105 determines whether the data should be evicted to first L2 cache 106 or second L2 cache 107. Likewise, when data is to be evicted from second L1 cache 103, cache eviction location determining logic 105 determines whether the data should be evicted to first L2 cache 106 or second L2 cache 107. First L2 cache 106 and second L2 cache 107 are coupled to main memory 108.

Counter 104 is configured such that a cache miss to one of first L1 cache 102 or second L1 cache 103 causes counter 104 to be decremented, while a cache miss to the other of first L1 cache 102 or second L1 cache 103 causes counter 104 to be incremented.

Depending on whether the current value of counter 104 is above or below a given threshold, counter 104 causes cache eviction location determining logic 105 to evict data to either of first L2 cache 106 or second L2 cache 107.

Counter 104 saturates at certain limits. Thus, when counter 104 has reached an upper limit, it is not incremented above the upper limit, but remains at the upper limit until decremented. Likewise, when counter 104 has reached a lower limit, it is not decremented below the lower limit, but remains at the lower limit until incremented.

Cache eviction determining logic 105 compares the value of counter 104 to one or more thresholds to determine the L2 cache to which an entry should be evicted. The thresholds may be preset or adaptive. The thresholds may indicate that an entry should be evicted to a specific cache or may indicate that a further decision process should be performed to determine the cache to which the entry should be evicted.

As another alternative, counter 104 may obtain information from first L2 cache 106 and second L2 cache 107 via couplings 122 and 123, respectively. The information from first L2 cache 106 and second L2 cache 107 may be used to determine the relative cache miss rates of the first L2 cache 106 and the second L2 cache 107. The relative cache miss rates are tracked by counter 104. Based on the relative cache miss rates tracked by counter 104, the cache eviction location determining logic 105 causes a cache entry to be assigned to first L2 cache 106 or to second L2 cache 107.

Figure 2:
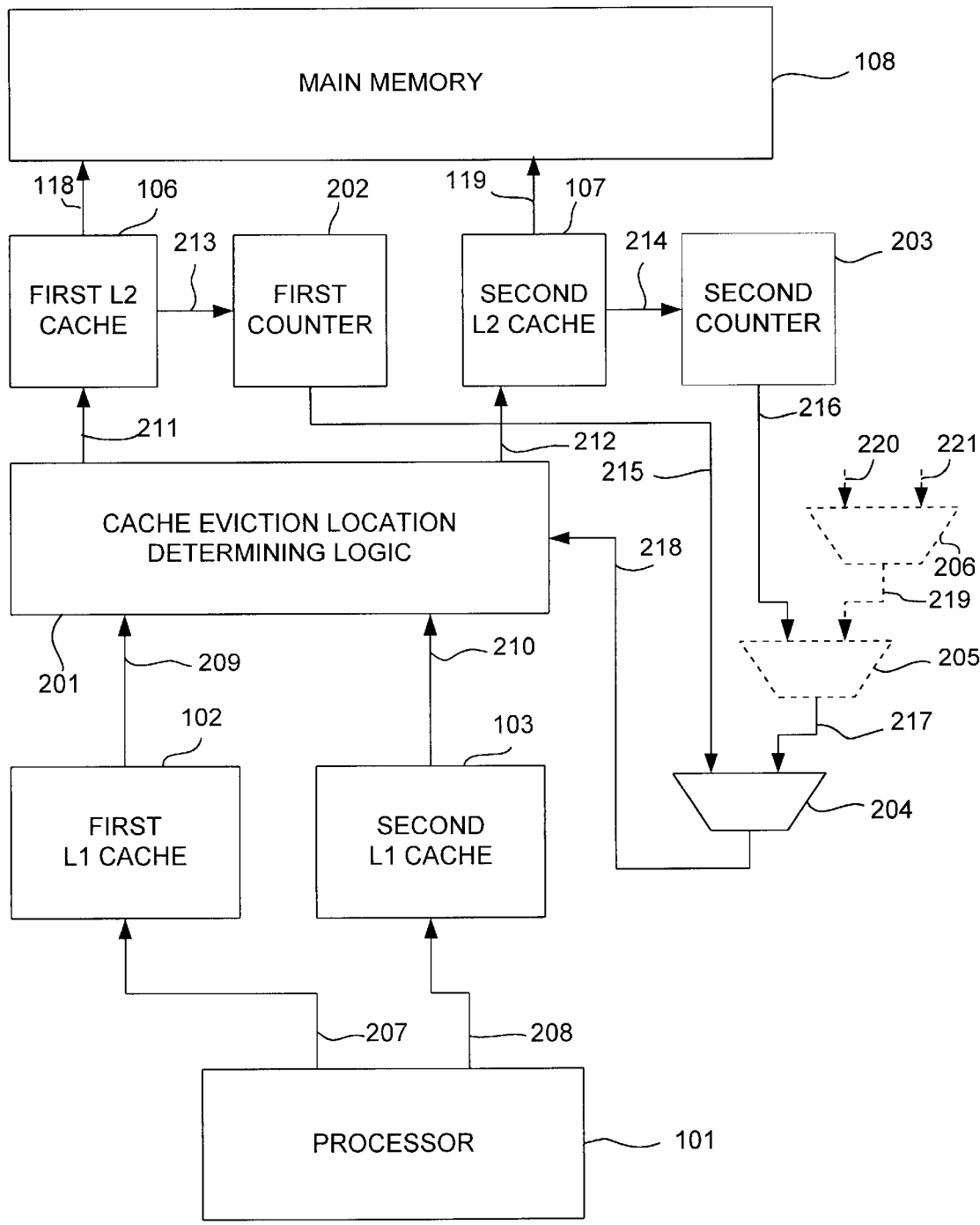
FIG. 2 is a block diagram illustrating an embodiment of the present invention.

FIG. 2 is a block diagram illustrating an embodiment of the present invention. Processor 101 is coupled via couplings 207 and 208 to first L1 cache 102 and second L1 cache 103, respectively. First L1 cache 102 is coupled via coupling 209 to cache eviction location determining logic 201. Second L1 cache 103 is coupled via coupling 210 to cache eviction location determining logic 201. Cache eviction location determining logic 201 is coupled via coupling 211 to first L2 cache 106. Cache eviction location determining logic 201 is coupled via coupling 212 to second L2 cache 107. First L2 cache 106 and second L2 cache 107 are coupled via couplings 118 and 119, respectively, to main memory 108. First L2 cache 106 is coupled via coupling 213 to first counter 202. Second L2 cache 107 is coupled via coupling 214 to second counter 203. First counter 202 is coupled via coupling 215 to comparator 204. Second counter 203 is coupled via coupling 216 to comparator 205. Couplings 220 and 221 may be coupled to additional counters of additional L2 caches. Counters coupled to couplings 220 and 221 are compared by comparator 206. Comparator 206 is coupled via coupling 219 to comparator 205. Comparator 205 is coupled via coupling 217 to comparator 204.

Comparator 204 is coupled via coupling 218 to cache eviction location determining logic 201.

As data are allocated and deallocated from first L2 cache 106 and second L2 cache 107, the values of first counter 202 and second counter 203 are changed.

Comparator 204 compares the values of first counter 202 and second counter 203 and provides an indication via coupling 218 to cache eviction location determining logic 201.

Cache eviction location determining logic 201 determines which of first L2 cache 106 and second L2 cache 107 should be used to evict data from either of first L1 cache 102 or second L1 cache 103. The eviction is performed on the basis of the amount of empty space, or conversely, allocated space, of first L2 cache 106 and second L2 cache 107. As indicated by comparators 205 and 206, as well as couplings 220 and 221, this technique may be extended to additional L2 caches.

Figure 3:
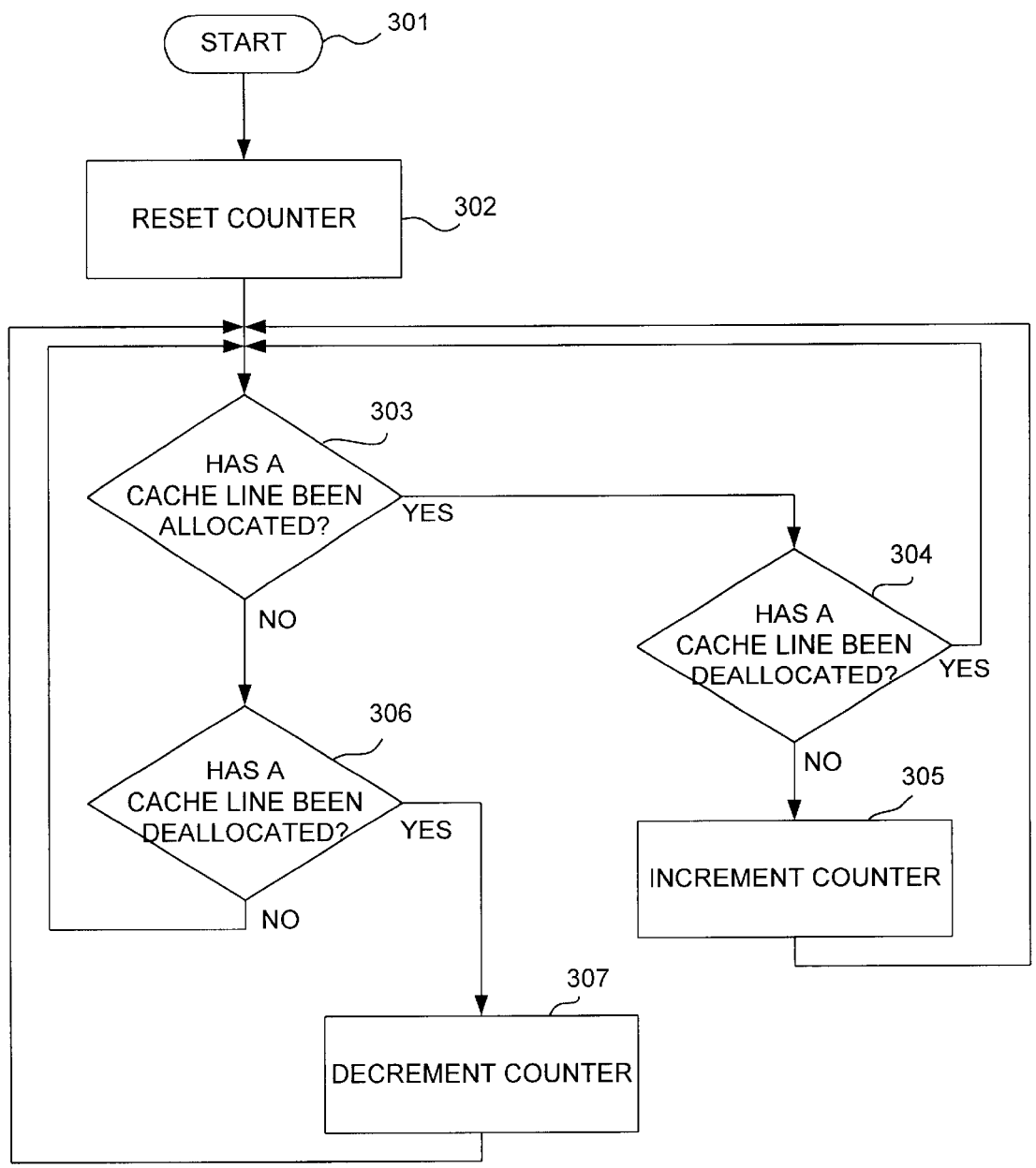
FIG. 3 is a flow diagram illustrating a process according to an embodiment of the present invention.

FIG. 3 is a flow diagram illustrating a process according to an embodiment of the present invention. The process begins in step 301. The process continues to step 302, in which a counter is reset. In step 303, a determination is made as to whether or not a cache line has been allocated. If the cache line has been allocated, the process continues to step 304. In step 304, a determination is made as to whether or not a cache line has been deallocated. If a cache line has been deallocated, the process returns to step 303. If a cache line has not been deallocated, the process continues to step 305. In step 305, the counter is incremented. From step 305, the process returns to step 303. If the determination in step 303 was that the cache line has not been allocated, the process continues to step 306. In step 306, a determination is made as to whether or not a cache line has been deallocated. If a cache line has been deallocated, the process continues to step 307. In step 307, the counter is decremented. From step 307, the process returns to step 303. If, in step 306, the determination is made that a cache line has not been deallocated, the process returns to step 303.

Figure 4:
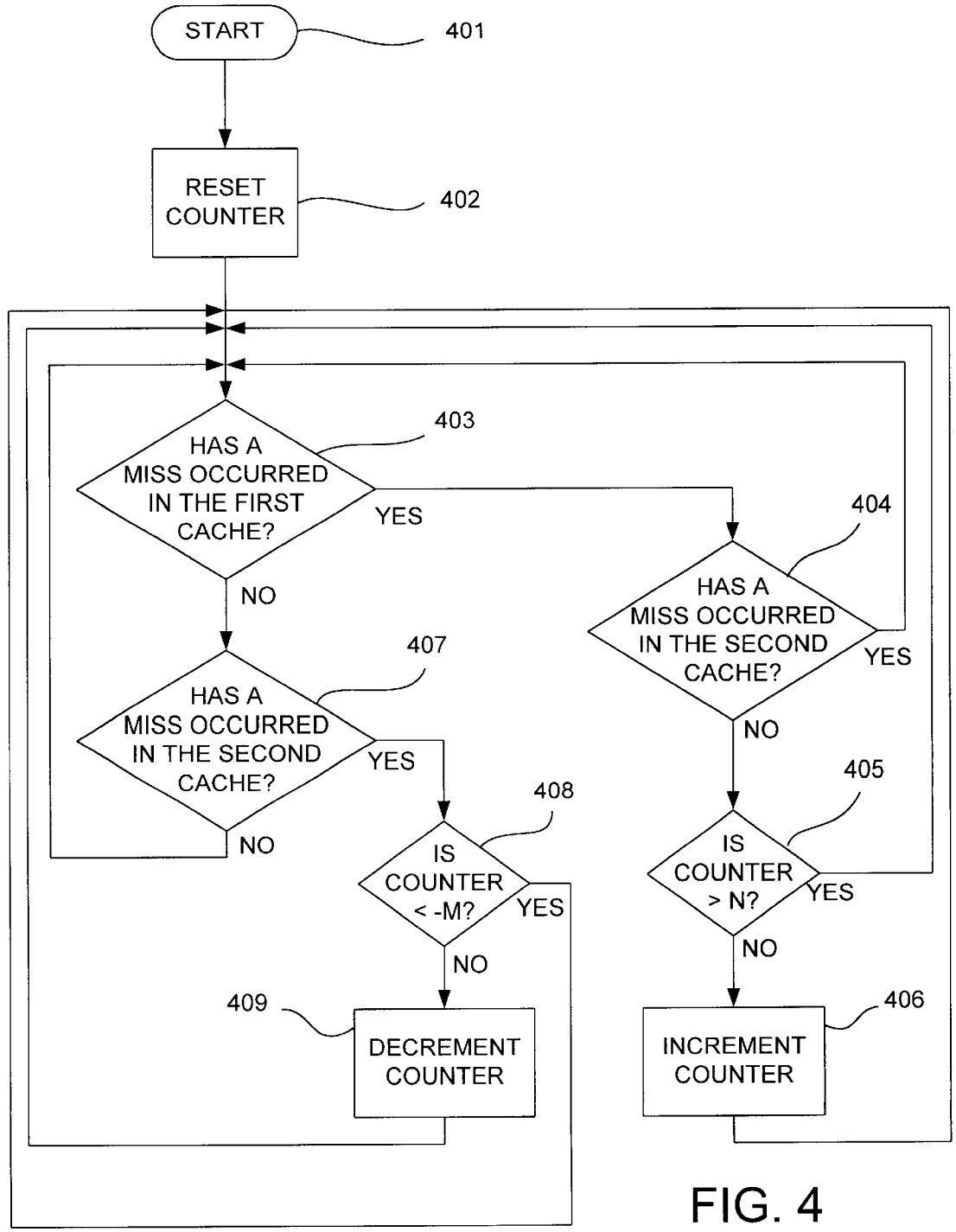
FIG. 4 is a flow diagram illustrating a process according to an embodiment of the present invention.

FIG. 4 is a flow diagram illustrating a process according to an embodiment of the present invention. The process begins in step 401. In step 402, a counter is reset. In step 403, a determination is made as to whether or not a miss has occurred in the first cache. If a miss has occurred in the first cache the process continues to step 404. In step 404, a determination is made as to whether or not a miss has occurred in the second cache. If a miss has occurred in the second cache, the process returns to step 403. If a miss has not occurred in the second cache, the process continues to step 405. In step 405, a determination is made as to whether the counter has a value greater than N. If the counter has a value greater than N, the process returns to step 403. If the counter does not have a value greater than N, the process continues in step 406. In step 406, the counter is incremented. From step 406, the process returns to step 403.

If, in step 403, the determination is made that a miss has not occurred in the first cache, the process continues to step 407. In step 407, a determination is made as to whether or not a miss has occurred in the second cache. If a miss has occurred in the second cache, the process continues to step 408. In step 408, a determination is made as to whether the counter has a value less than −M. If the counter has a value less than −M, when the process continues to step 403. If the counter does not have a value less than −M, the process continues to step 409. In step 409, the counter is decremented. From step 409, the process returns to step 403. If, in step 407, the determination is made that a miss did not occur in the second cache, the process returns to step 403.

Figure 5:
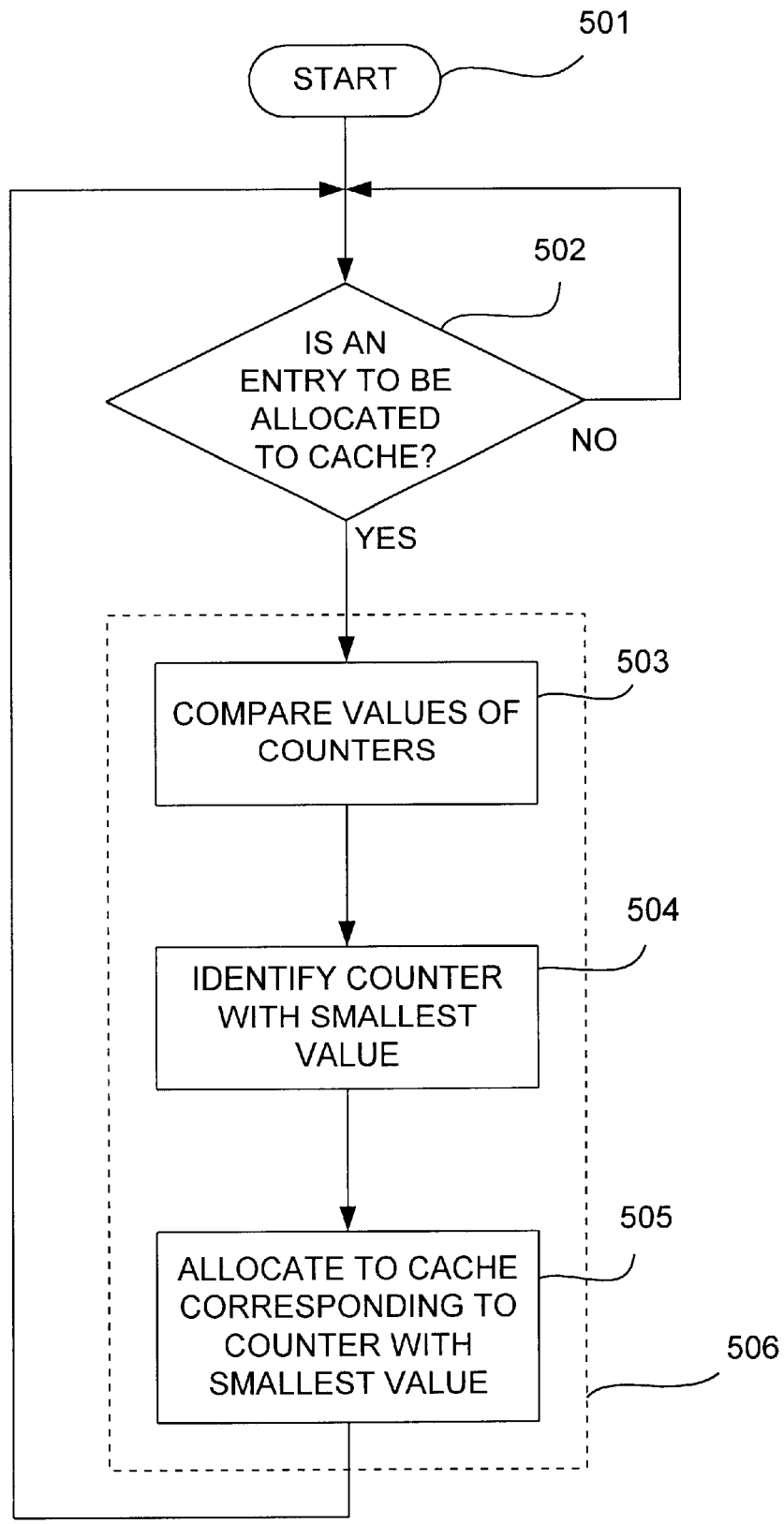
FIG. 5 is a flow diagram illustrating a process according to an embodiment of the present invention.

FIG. 5 is a flow diagram illustrating a process according to an embodiment of the present invention. The process begins in step 501. In step 502, a determination is made as to whether an entry is to be allocated to a cache. If an entry is not to be allocated to a cache, the process returns to step 502. If an entry is to be allocated to a cache, the process continues at step 506. In step 506, the entry is allocated to a cache selected from among multiple caches. Step 506 comprises the steps 503, 504, and 505. In step 503, the values of the counters are compared. In step 504, the counter with the smallest value is identified. In step 505, the entry is allocated to the cache corresponding to the counter with the smallest value. From step 505, the process returns to step 502.

Figure 6:
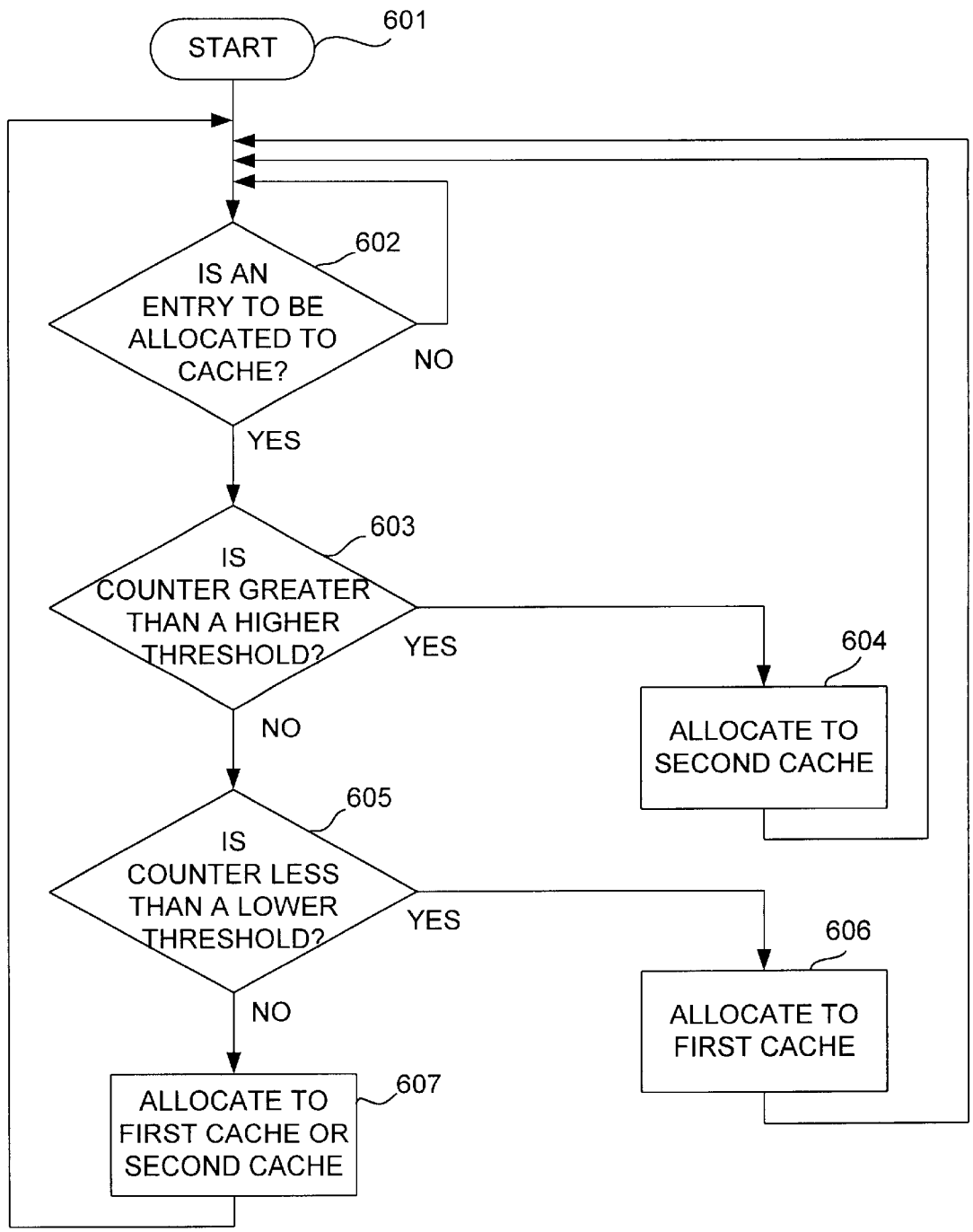
FIG. 6 is a flow diagram illustrating a process according to an embodiment of the present invention.

FIG. 6 is a flow diagram illustrating a process according to an embodiment of the present invention. The process begins in step 601. In step 602, a determination is made as to whether or not an entry is to be allocated to cache. If an entry is not to be allocated to cache, the process returns to step 602. If an entry is to be allocated to cache, the process continues to step 603. In step 603, a determination is made as to whether or not the counter is greater than a higher threshold. If the counter is greater than the higher threshold, the process continues to step 604. In step 604, the entry is allocated to the second cache. From step 604, the process returns to step 602.

If, in step 603 the determination is made that the counter is not greater than the higher threshold, the process continues to step 605. In step 605, a determination is made as to whether or not the counter is less than a lower threshold. If the counter is less than the lower threshold, the process continues to step 606. In step 606, the entry is allocated to the first cache. From step 606, the process returns to step 602. If, in step 605, the determination is made that the counter is not less than the lower threshold, the process continues in step 607. In step 607, the entry is allocated to either the first or the second cache according to a decision process. The decision process allocates entries among the first and second caches in a manner that is likely to have minimal difference in its effect on the cache miss rates among multiple caches. Examples of a decision process that may be used to implement the allocation in step 607 include random allocation among the first and second caches and alternating allocation among the first and second caches. From step 607, the process returns to step 602.

It should be understood that the implementation of other variations and modifications of the invention in its various aspects will be apparent to those of ordinary skill in the art, and that the invention is not limited by the specific embodiments described. For example, the specific number of caches, their levels, and their relationships may be varied. It is therefore contemplated to cover by the present invention, any and all modifications, variations, or equivalents that fall within the spirit and scope of the basic underlying principles disclosed and claimed herein.

What is claimed is:

1. A method for cache memory management in a system comprising a plurality of cache memory devices comprising:
    tracking empty space in the plurality of cache memory devices;
    allocating a cache entry to a first cache memory device of the plurality of cache memory devices, the first cache memory device having a largest amount of the empty space than other cache memory devices of the plurality of cache memory devices.

2. The method of claim 1 wherein the step of tracking empty space includes:
    incrementing a first counter corresponding to a first cache memory device upon allocation of a first cache line of the first cache memory device;
    decrementing the first counter upon deallocation of the first cache line;
    incrementing a second counter corresponding to a second cache memory device upon allocation of a second cache line of the second cache memory device;
    decrementing the second counter upon deallocation of the second cache line.

3. The method of claim 1 wherein the step of allocating a cache entry includes the step of:
    identifying a smallest value counter from among the first counter and the second counter, the smallest value counter having a smallest value.

4. The method of claim 3 wherein the step of allocating a cache entry further includes the step of:
    allocating a cache entry to a smallest value cache memory device from among the first cache memory device and the second cache memory device, the smallest value counter corresponding to the smallest value cache memory device.

5. The method of claim 4 wherein step of allocating a cache entry further includes the step of:
    comparing a first value of the first counter to a second value of the second counter.

6. The method of claim 1 wherein the step of tracking empty space includes:
    decrementing a first counter corresponding to a first cache memory device upon allocation of a first cache line of the first cache memory device;
    incrementing the first counter upon deallocation of the first cache line;
    decrementing a second counter corresponding to a second cache memory device upon allocation of a second cache line of the second cache memory device;
    incrementing the second counter upon deallocation of the second cache line.

7. The method of claim 6 wherein the step of allocating a cache entry includes the step of:
    identifying a largest value counter from among the first counter and the second counter, the largest value counter having a largest value.

8. The method of claim 7 wherein the step of allocating a cache entry further includes the step of:
    allocating a cache entry to a largest value cache memory device from among the first cache memory device and the second cache memory device, the largest value counter corresponding to the largest value cache memory device.

9. The method of claim 8 wherein step of allocating a cache entry further includes the step of:
    comparing a first value of the first counter to a second value of the second counter.

10. A method for cache memory management in a system comprising a first plurality of cache memory devices at a first level and a second plurality of cache memory devices at a second level, the method comprising the steps of:
    tracking first empty space in the first plurality of cache memory devices;
    allocating a cache entry to a first cache memory device of the first plurality of cache memory devices, the first cache memory device having a first largest amount of the first empty space than a second cache memory device of the first plurality of cache memory devices;
    tracking second empty space in the second plurality of cache memory devices; and
    allocating the cache entry to a third cache memory device of the second plurality of cache memory devices, the second cache memory device having a second largest amount of the second empty space than a fourth cache memory device of the second plurality of cache memory devices.

11. Apparatus for cache memory management in a system comprising a plurality of cache memory devices comprising:
    a first cache memory device of the plurality of cache memory devices;
    a second cache memory device of the plurality of cache memory devices;
    a first counter operatively coupled to the first cache memory device, the first counter tracking a first empty space of the first cache memory device;
    a second counter operatively coupled to the second cache memory device, the second counter tracking a second empty space of the second cache memory device;
    a comparator operatively coupled to the first counter and to the second counter, the comparator comparing the first empty space to the second empty space; and
    cache eviction location determining logic operatively coupled to the comparator, the cache eviction location determining logic determining which of the first cache memory device and the second cache memory device is to be assigned a cache entry.

* * * * *